(12) United States Patent
Lundberg et al.

(10) Patent No.: US 12,536,135 B2
(45) Date of Patent: Jan. 27, 2026

(54) TEMPLATE APPLICATION PROGRAM

(71) Applicant: Black Hills IP Holdings, LLC, Minneapolis, MN (US)

(72) Inventors: Steven W. Lundberg, Edina, MN (US); Thomas G. Marlow, Cape Elizabeth, ME (US)

(73) Assignee: Black Hills IP Holdings, LLC, Minneapolis, MN (US)

( * ) Notice: Subject to any disclaimer, the term of this patent is extended or adjusted under 35 U.S.C. 154(b) by 35 days.

(21) Appl. No.: 17/659,227

(22) Filed: Apr. 14, 2022

(65) Prior Publication Data
US 2022/0335006 A1    Oct. 20, 2022

Related U.S. Application Data

(60) Provisional application No. 63/174,852, filed on Apr. 14, 2021.

(51) Int. Cl.
*G06F 16/11*    (2019.01)
*G06F 16/17*    (2019.01)
*G06F 16/18*    (2019.01)

(52) U.S. Cl.
CPC ........ *G06F 16/122* (2019.01); *G06F 16/1734* (2019.01); *G06F 16/1873* (2019.01)

(58) Field of Classification Search
CPC . G06F 16/122; G06F 16/1873; G06F 16/1734
See application file for complete search history.

(56) References Cited

U.S. PATENT DOCUMENTS

| 6,549,894 | B1* | 4/2003 | Simpson | G06F 16/21 707/999.005 |
|---|---|---|---|---|
| 7,631,004 | B2* | 12/2009 | Skibo | G06F 40/186 707/999.102 |
| 8,135,755 | B2* | 3/2012 | Selca | G06F 16/211 707/803 |
| 8,874,476 | B1* | 10/2014 | Taylor, III | G06Q 10/10 705/311 |
| 11,887,057 | B2* | 1/2024 | Defusco | G06F 16/447 |
| 2006/0069605 | A1* | 3/2006 | Hatoun | G06Q 10/0633 705/7.26 |
| 2006/0178925 | A1* | 8/2006 | Meece | G06Q 10/1095 705/7.19 |
| 2011/0213808 | A1* | 9/2011 | Rheaume | G06F 16/93 707/802 |

(Continued)

OTHER PUBLICATIONS

Gramckow et al. "Caseflow Management Key Principles and the Systems to Support Them", 2013, https://documents1.worldbank.org/curated/en/368901468325193887/pdf/811210NWP0Case0Box0379828B00PUBLIC0.pdf (Year: 2013).*

*Primary Examiner* — Matthew J Ellis
(74) *Attorney, Agent, or Firm* — Schwegman Lundberg & Woessner, P.A.

(57) ABSTRACT

The present disclosure includes system and methods for executing an action for a file, including receiving a plurality of items to be docketed, wherein each of the plurality of items includes one or more types of respective docket items, locating a plurality of templates, each of the plurality of templates associated with one of the plurality of items to be docketed, and executing one or more actions for each of the plurality of items to be docketed based on the correlated plurality of templates.

18 Claims, 9 Drawing Sheets

(56) References Cited

U.S. PATENT DOCUMENTS

| | | | |
|---|---|---|---|
| 2011/0264711 A1* | 10/2011 | Thang | G06F 8/34 |
| | | | 715/764 |
| 2014/0280460 A1* | 9/2014 | Nemer | G06F 16/24578 |
| | | | 709/219 |
| 2015/0199779 A1* | 7/2015 | Lundberg | G06Q 50/184 |
| | | | 705/310 |
| 2016/0147955 A1* | 5/2016 | Shah | G16H 40/20 |
| | | | 705/2 |
| 2018/0239959 A1* | 8/2018 | Bui | G06F 16/93 |

* cited by examiner

TEMPLATE APPLICATION PROGRAM

CLAIM FOR PRIORITY

This application claims the benefit of priority to U.S. Application Ser. No. 63/174,852, filed Apr. 14, 2021, which is hereby incorporated by reference in its entirety.

BACKGROUND

For a given project, a variety of deadlines and tasks may be required. When the project is collaborative, such as with an outside firm or company, communication between the outside firm and the internal project management can be required to properly docket deadlines, tasks, or other actions that should be met throughout the course of the project. Often, this aspect of project management is done through free form communication and human interpretation of instructions from the outside firm.

In some cases, multiple projects of the same type may have similar types of deadlines and tasks required throughout the course of the project. For this reason, the outside firm may instruct the internal project management in the same way for each of these multiple projects of the same type. For example, for a particular type of project, where a first event A occurs, the outside firm may instruct the internal project manager to make a deadline A for the project. This can be consistent across that particular type of project.

Different outside firms may issue different communication or instructions based on the particular project type and project event. For example, for first event A discussed above, a first outside firm may require a deadline of one month, while a second outside firm may require a deadline of two months. The variety in project types, projects events or tasks, and multiple outside firms or organizations collaborating with the internal project manager can create a significant amount of work and human oversight for project management.

SUMMARY OF THE DISCLOSURE

The present disclosure provides systems and methods for project management leveraging a template library to allow semi-automated or automated docketing of project event tasks and deadlines. The template library can include templates correlated to particular outside organization or firm instructions, particular project types, specific events occurring within projects, or combinations thereof.

With a large number of varying deadlines and tasks required for a given project, and those deadlines and task varying depending on the project type, events occurring in the project, and the collaborating outside firm working on the projects, streamlined templates for identifying, recording, and executing deadlines and tasks are desired.

A template library can include a variety of templates that can be applied to an incoming project communication. The template can be selected, for example, based on project type, the particular event occurring within that project, the outside firm collaborating on the project, or combinations thereof. The application of a particular template can allow for automated docketing of a particular deadline or task. This can free up human reviewers for more complicated tasks.

In an example, a method of executing an action for a file can include receiving an item to be docketed from one of a plurality of sources for the file, selecting a template for the item to be docketed based on the source of the item to be docketed, implementing the template for the item to be docketed, producing the information from the template and communicating the information to a receiving system, and executing the at least one task in the receiving system based on the information supplied by the template. The item to be docketed can include at least one task to be completed, and wherein the item to be docketed is a one of a plurality of types of item to be docketed. Each of the plurality of sources can be associated with one or more templates. The template can include one or more requirements for information to be supplied to report the item to be docketed.

In an example, a method of executing an action for a file can include receiving an item to be docketed from one of a plurality of possible sources for the file having a file type, wherein the item to be docketed comprises at least one task to be completed, wherein the item is a one of a particular type of item to be docketed; in response to the source of the item to be docketed, selecting a template for the item to be docketed, the template comprising one or more requirements for data to be supplied to report the item, wherein different ones of the sources are associated with different templates to be used to report the same type of item; communicating the data to a receiving system; and executing one or more actions in the receiving system using the data supplied by the template In an example, a system for docketing incoming tasks can include a template library comprising a plurality of templates correlated to the incoming tasks, each of the plurality of templates indicating one or more actions to be taken based on the correlated incoming task; a template application program for receiving information regarding one the incoming tasks, the template application program configured to choose one or more templates based on the incoming tasks and produce instructions for executing the one or more actions; an automated docketing system for receiving instructions regarding one or more action, and executing the one or more action.

In an example, a non-transitory computer-readable medium that stores instructions that when executed by one or more processors cause the one or more processors to perform operations comprising: receiving an item to be docketed from one of a plurality of sources for the file, selecting a template for the item to be docketed based on the source of the item to be docketed, implementing the template for the item to be docketed, producing the information from the template and communicating the information to a receiving system, and executing the at least one task in the receiving system based on the information supplied by the template. The item to be docketed can include at least one task to be completed, and wherein the item to be docketed is a one of a plurality of types of item to be docketed. Each of the plurality of sources can be associated with one or more templates. The template can include one or more requirements for information to be supplied to report the item to be docketed.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
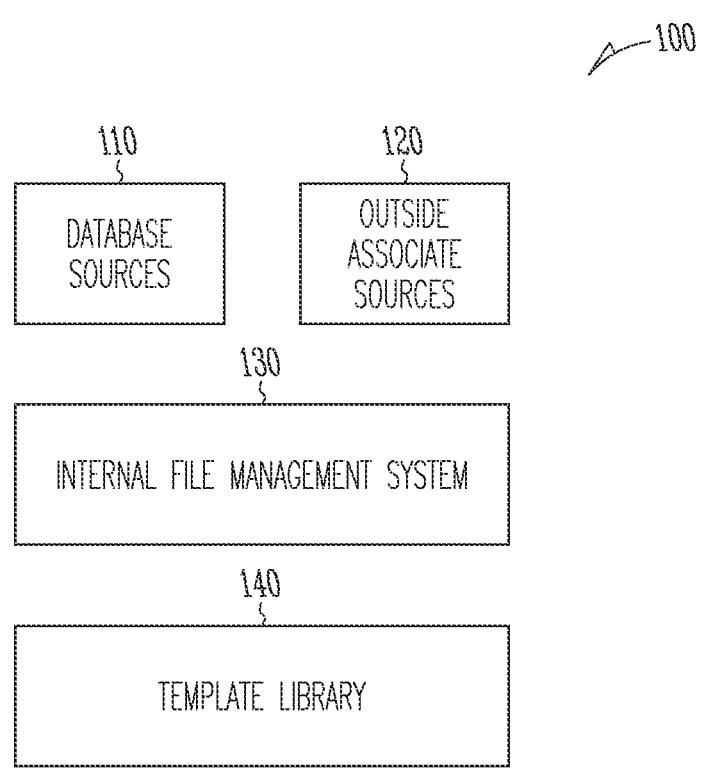
FIG. 1 depicts a schematic diagram of a template application for use with a docketing system.

The present disclosure describes, among other things, methods and system for automated identifying and docketing of tasks and deadlines for project management. The method uses a template application program for selecting and leveraging a library of templates that are applicable to the project. The template application program can identify a project type and associate a related template to automatically identify, docket, and/or execute actions to be taken for that type of project.

Terminology

As used herein, "electronic communication" refers to an electronic message or a method of exchanging messages between people using electronic devices.

As used herein, "template" can include a preset format for a document or file, used so that the format does not have to be recreated each time it is used. In some cases, a template can include one or more fields to be filled out.

As used herein, "application" or "program" can include a program or piece of software designed and written to fulfill a particular purpose of the user, such as a database application.

As used herein, "associate" can include a partner or colleague in business or at work, either internal or external.

As used herein, "unstructured text" or "unstructured data" refers to data that is not organized in a standard format, for example, text in the body of an electronic communication.

As used herein, "structured text" or "structured data" refers to data that is organized in a standard format such that a recipient may read the data and institute an automated computing system action without human interpretation of the data.

As used herein, "scraping," "web scraping," "data scraping," or "web crawling," can refer to automatically mining or collecting data or information, such as from a database or from the internet.

As used herein, "file" or "matter" can refer to a particular project, enterprise, or undertaking being worked on by an individual or a collaborative group, planned and designed to achieve a particular aim.

As used herein, "official record," or "file history," can refer to data about a file or matter denoting evidence about past events or tasks within that file or matter, such as an electronic record of previous events in the file or matter. An "official record" can be stored with and maintained by an overseeing agency or organization, such as a governmental organization.

As used herein, "database," can refer to a structured set of data, such as held in a computer or on the internet, that can be accessible in various ways.

Overview

Discussed herein are methods and systems for docketing incoming items, such as documents or messages, for a given file. The item to be docketed can be received from any of a variety of sources, such as an outside database, external or internal associate, a governmental agency, or other source. The item to be docketed can be one of a variety of types of items to be docketed for that type of file.

A template can be selected based on the source of the item to be docketed, and in some examples, the type of the item to be docketed. The template can include various requirements for information to be supplied to docket the item. The template can be implemented, such as by being filled out, based on the item to be docketed. This can allow for production of information or data relating to the item to be docketed. This information can be sent to a receiving system, where one or more actions or tasks can be executed based on the information produced by the template.

Document Management System

FIG. 1 depicts a schematic diagram of a template application 100 for use with a docketing system. The template application 100 can include sources of information 110, 120, and internal file management system 130, and a template library 140, in template application 100, an incoming communication indicating an event in a project or file can be docketed using a template from the template library 140.

The incoming communication can be received from the outside associated sources 120 or the database sources 110. The sources 110, 120, can include a plurality of sources, such as computer system or networks with respective associates. The incoming communication can include one or more items to be docketed. The items to be docketed can be, for example, electronic communication optionally include one or more particular types of documents to be reported. The items to be docketed can indicate one or more tasks to complete, such as deadlines, actions to be take, communications to send, or other tasks.

Database sources 110 can include databases of information about projects maintained by governmental or overseeing organizations that may be involved with the project. For example, the database can be maintained by the World Intellectual Property Organization (WIPO), the European Patent Office (EPO), or other governmental body. Database sources 110 can be linked to the template application 100 such that the template application 100 can scrape or collect data from the database sources 110 directly.

Outside associate sources 120 can include external firms, companies, or organizations that work with the internal project manager on one or more projects. For example, the outside associate source 120 can be a foreign associate office, an inside counsel, or other collaborator on the project. The outside associate sources 120 can, for example, be in communication with the internal project manager about events, deadlines, and tasks in the particular project. The template application 100 can receive data from the outside associated sources 120 as it is received.

Incoming sources of data and documents may include internal sources 110, external organization sources 110, or other third-party sources. Internal sources 110 of data and documents may include, for example, employee created deadlines or meeting dates, or reminders for upcoming deadlines associated with the external organization.

External organization sources 120 may include, for example, communications from the external organization, such as incoming e-mail messages, paper mail, or phone calls. The external organization sources 120 may potentially include documents associated with the particular file or project, such as written documents or spreadsheets with relevant information. The external organization sources 120 may potentially include deadlines or due dates for response to the external organization.

External organization sources 120 may further include, for example, communications from a third-party business or organization working in conjunction with the office on the project or file. For example, the third-party may be a foreign office working on parts of a project relevant to their residency. Third-party sources of incoming information may include communications such as telephone calls, paper mail, e-mail, or other forms of communication. Like the other sources of information, third-party sources may potentially include documents and/or deadlines and due dates for response to the third party and/or the external organization.

The template application 100 can be in communication with the internal file management system 130. The internal file management system 130 can be electronic, and can include records related to relevant projects and files, such as a file histories of events, communications, and deadlines. The file management system 130 may receive data and documents from any and/or all of these sources 110, 120. Incoming sources of data and documents may induce one or more actions that may be taken within the office. File management system 320 may be a partially or wholly automated system for synthesizing incoming data and documents. File management system 130 may receive and analyze incoming documents or data from sources 110, 120.

Based on the information from those sources, file management system 130 may produce a task list, a calendar of deadlines, and/or a system of reminders encompassed in a workflow. The file management system 130 may synthesize the incoming data and documents, and associated actions to produce the workflow, which may indicate to the office what should be done in a given project and by which due date(s).

The workflow may, for example, be a list, calendar, or other tracking system showing tasks and deadlines associated with the particular file or project. For example, if a document including a response deadline is received from the external organization to file management system 130, the file management system 130 may recognize the response deadline and add it to the workflow.

The file management system 130 can work in conjunction with the template library 140 such that information regarding incoming sources of information 110, 120, is properly provided to the file management system 130.

Figure 2:
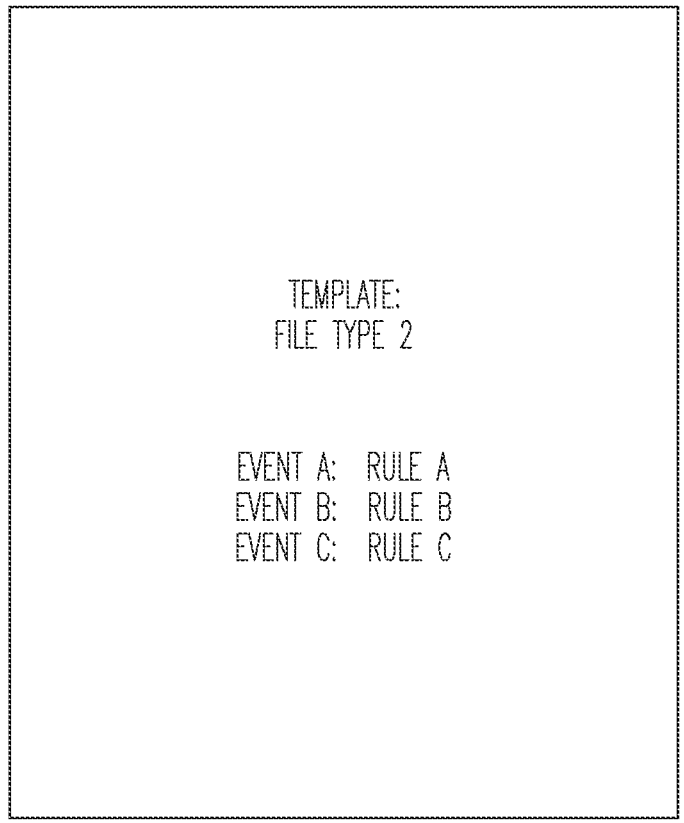
FIG. 2 depicts a schematic diagram of an example template.

The template library 140 can include a series of templates, each correlated to one or more projects, types of projects, outside associates, or sources of information. An examples of such templates is shown in FIG. 2. For example, for a specific type of file, such as a European design registration, a trademark registration, a PCT patent application, or others, the template library 140 can include one or more templates correlated to that type of file and to specific events that commonly occurring during the lifetime of that type of file.

Similarly, when the user works frequently with another, outside firm, such as a foreign law firm, template can be stored correlated to that particular outside firm. In some cases, a foreign law firm has preferences for when instructions are required before a due date. In this case, a template for a project file can be filled out to produce data, or information indicating when the instructions are due to the foreign firm prior to the official due date of the item or event in the project file.

The template library 140 can include a variety of templates, correlated to file type, source of information, or other qualities. The templates in the library can be automated or semi-automated templates that can be executed for docketing a specific incoming item with minimal human oversight.

Template

FIG. 2 depicts a schematic diagram of an example template 200. The template 200 can be a form with one or more fields requiring user input, a set of directions related to the file to which the template correlates, or a combination thereof.

The template 200 can be selected based on the source of the item to be docketed, and/or the type of item to be docketed. Once the template 200 is selected, the template 200 can include fields to be filled out by a template application or program, such as item type, file type, dates, other bibliographic data, or notes. When filled out, the template can produce data or information indicating one or more tasks to be completed based on the item to be docketed.

Template Application

Figure 3:
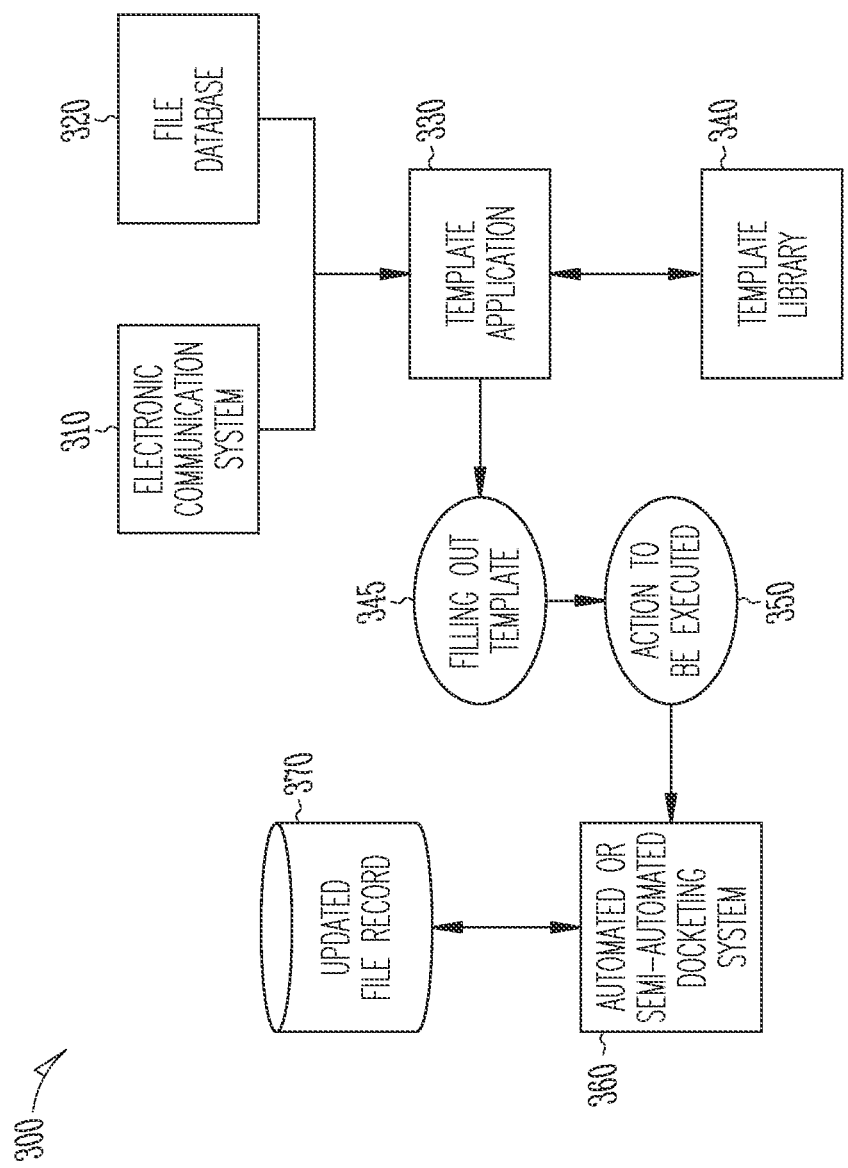
FIG. 3 depicts a schematic diagram of an automated or semi-automated docketing system using a template application.

FIG. 3 depicts a schematic diagram of an automated or semi-automated docketing system 300 using a template application. The system 300 can include electronic communication system 310, file database 320, template application 330, template library 340, action to be executed 350, docketing system 360, and updated file record 370.

The electronic communication system 310 can be, for example, an e-mail server or other communication system. The file database 320 can include a repository of files or projects being working on by the company.

The template application 330 can be a program or app, located on the internet or locally on a device, for processing of incoming notices of events occurring within an ongoing project. For example, the template application 330 can be similar to the template application 100 described above. The template application 330 can work in conjunction with the other components of system 300 to maintain and update records, tasks, and deadlines, for projects being worked on internally or in cooperation with one or more outside organizations.

The template library 340 can host the templates with which the template application 330 can interact. The template library 340 can be organized, for example, by template type, such as templates related to a particular outside associate, or related to a particular type of item in a file. The template application 330 can have access to the template library 340 and selectively pull templates from the library 340 for use when a particular item to be docketed comes in.

The template application can, in some cases, be trained through machine learning to recognize and select the appropriate template, use a look-up table or database, or other appropriate methods at this step. In some cases, the template application can be trained to identify the source of the item to be docketed, such as by an address or electronic name (e.g., an e-mail address or website) from which the item is provided. In some cases, the template application can use a text recognition technique to analyze the incoming communication from the foreign associate to identify key words, phrases, numbering, or concepts, and correlate these to a specific type of item to be docketed.

After the template is selected, the template can be filled out. In this step, the source of the item to be docketed, such as the foreign associate, governmental agency, or other external source, can be filled out in the templated. The type of item to be docketed can additionally be filled out in the template. The template can include additional fields, depending on the specific source and type of item to be docketed, that can also be filled out. For example, a date of receipt field can be filled out.

Once the template is filled out (345), the template application 330 can produce data or information based on the completed template. This data or information can indicate one or more actions to be executed 350. The one or more actions to be executed can be, for example, filing away associated documents, scheduling a deadline based on the data, creating one or more prompts or reminders for the file, or other actions associated with the item. These actions can be executed in the docketing system 360 to update the record of the file 370.

Figure 4:
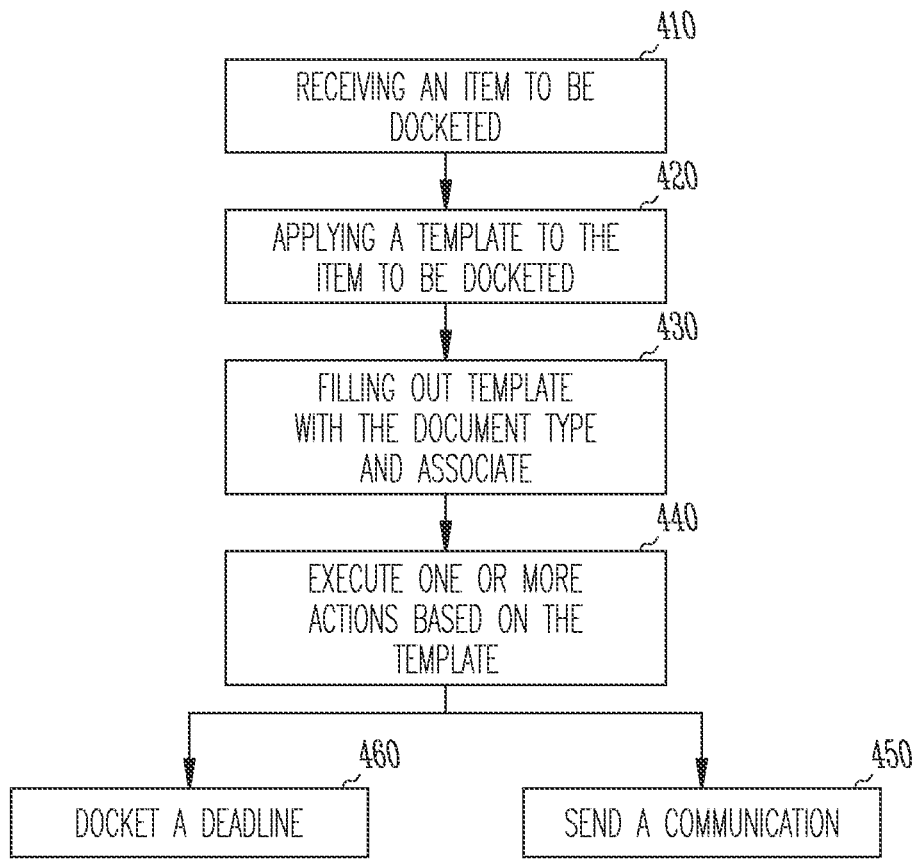
FIG. 4 depicts a schematic diagram of a method of using the template application in docketing.

FIG. 4 depicts a schematic diagram of a method 400 of using the template application in docketing. Method 400 can include blocks 410 to 460. In method 400, an item is received and docketed using a template from the template library, causing an action to be taken or deadline or be recorded.

For example, in block 410, an item is received by the template application. The item to be docketed can be received, for example, as an attachment to an electronic communication, embedded in an electronic communication, or scrapped directly from a database.

The item can be a notice about an event occurring in an ongoing project or file. For example, the template application can receive a communication from an electronic communication system, such as an e-mail, that details a new report from a governmental agency on the file. The new report from the governmental agency may indicate a response that is due at a certain deadline in the future.

In block 420, a template can be selected and applied by the template application for the item to be docketed. For example, the template application can determine that the item to be docketed is a communication from a foreign associate regarding a new report from a governmental agency on that file. In this case, the template application can correlate the source of the item to be docketed, the particular foreign associate, and choose from a group of templates specifically for that foreign associate. The template application can further choose a singular template correlated to the specific item to be docketed, based on the contents or type of new report from the governmental agency provided by the foreign agent.

The template application can, in some cases, be trained through machine learning to recognize and select the appropriate template, use a look-up table or database, or other appropriate methods at this step. In some cases, the template application can be trained to identify the source of the item to be docketed, such as by an address or electronic name (e.g., e-mail address or website) from which the item is provided. In some cases, the template application can use a text recognition technique to analyze the incoming communication from the foreign associate to identify key words, phrases, numbering, or concepts, and correlate these to a specific type of item to be docketed.

After the template is selected, the template can be filled out (step 430). The template can provide various rules and actions to be executed. In this step, the source of the item to be docketed, such as the foreign associate, governmental agency, or other external source, can be filled out in the templated. The type of item to be docketed can additionally be filled out in the template. The template can include additional fields, depending on the specific source and type of item to be docketed, that can also be filled out. For example, a date of receipt field can be filled out.

Each of the fields filled out in the template can be used by the template application to produce data or other information. For example, if the source of the item to be docketed is a foreign associate who requires a notice of receipt, filling out the template field for the source as "foreign associate" can produce data indicating that a notice of receipt should be sent. In another example, where the item to be docketed is a notice of rejection from a patent office that has a due date for response, when the type of item is filled out in the template, data regarding the date can be produced.

In step 440, the data and information produced by filling out or implementing the template can be used to execute one or more actions within a docketing system or a file history. For example, if data produce by the template indicates a notice of receipt should be sent to a foreign associate who provided the item to be docketed, the system can execute an action sending an electronic communication confirming receipt to the foreign associate (step 450). In another example, where filling out the template produced data indicating, a due date for a response, the due date can be docketed in the file so that persons working on the file are aware of the upcoming date (step 460). Additional examples are discussed with reference to FIGS. 5-8 below.

Figure 5:
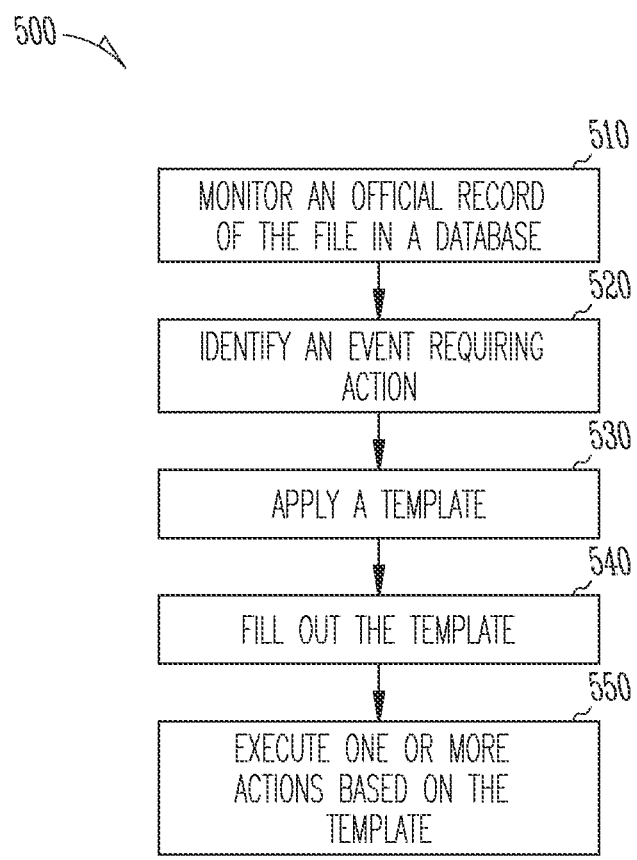
FIG. 5 depicts a schematic diagram of a method of using the template application while monitoring a database in docketing.

FIG. 5 depicts a schematic diagram of a method 500 of using the template application while monitoring a database in docketing. Method 500 can include blocks 510 to 560. The method 500 is similar to the method 400. However, in method 500, instead of receiving an electronic communication with an item to be docketed, a database is monitored and scraped for items to be docketed. (Step 510).

In step 510, an automated or semi-automated system is in electronic communication with and monitoring a database, such as an official governmental database or an unofficial database. Particular files can be monitored. In an example, the WIPO database could be monitored, so that particular patent applications can be monitored. The monitoring of the database can be continuously, intermittent, or on a predetermined schedule.

The system can monitor a particular file in the database, and scrap data from the database into the internal docketing system. In this case, the system can compare scraped data from the database to data already in the internal docketing system, and flag new events or items that have appeared. For example, where an international search report is issued in the WIPO database, the system can scrap the international search report and appropriate biographic data, and provide this to the docketing system.

In this way, the system can identify an item needing attention (step 520). The system can be trained to recognize new events in a database file that require action items or review. This can be done, for example, with machine learning, or by a look-up table or correlated database. In some cases, the system can be programed to check for particular items to be docketed during typical time frames in which a new event is expected in the database. The system can identify the type of item being scrapped that may be an item for docketing.

Once the item is selected and provided, the template application can selected an appropriate template (step 530), fill out the template (step 540), and execute one or more actions based on the template data (step 550).

Figure 6:
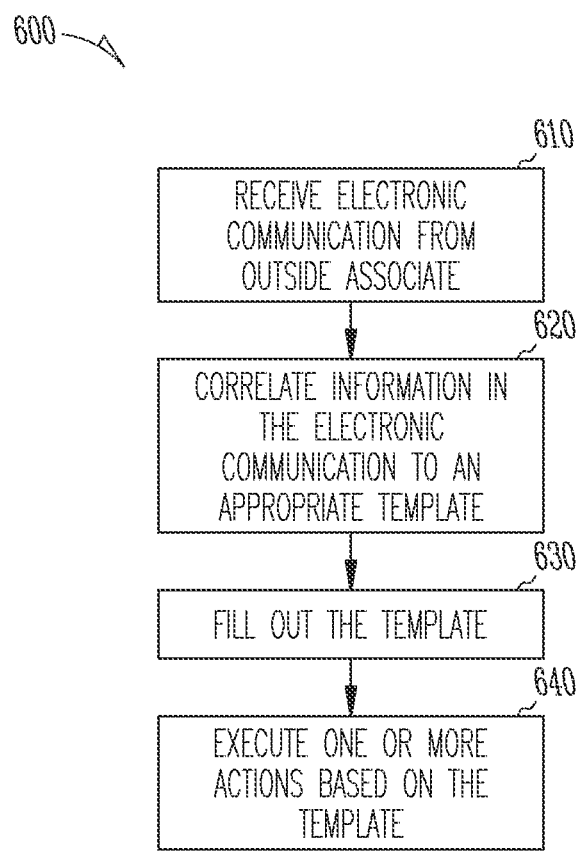
FIG. 6 depicts a schematic diagram of a method of using the template application when receiving an electronic communication from an outside associate in docketing.

FIG. 6 depicts a schematic diagram of a method 600 of using the template application when receiving an electronic communication from an outside associate in docketing. Method 600 can include blocks 610 to 660. The method 600 is similar to the method 400. However, in method 600, the incoming item to be docketed is from an outside associate.

For example, in method 600, a European attorney can send an electronic communication to the internal recipient (step 610). The electronic communication can include a message from the European attorney, and one or more attached or embedded documents. The message and/or the documents can include one or more items to be docketed.

The template application can review the electronic communication to determine what the item(s) to be docketed are, and which templates are appropriate. For example, the template application may recognize text in the electronic communication, or numbers or codes in the documents, and determine that the electronic communication indicates a search report issued in the case. The template application can the correlate the information in the electronic communication to the appropriate template for a search report provided by this particular European associate (step 620).

The template application can then fill out the template according to the information provided in the electronic communication and any documents (step 630). The completed template can produce data and information. The system can accordingly execute one or more actions based on the produced data (step 640). For example, a template for a search report from the European Associate may produce data regarding a deadline for response to the European Associate, and a deadline for responding to the search report itself.

Figure 7:
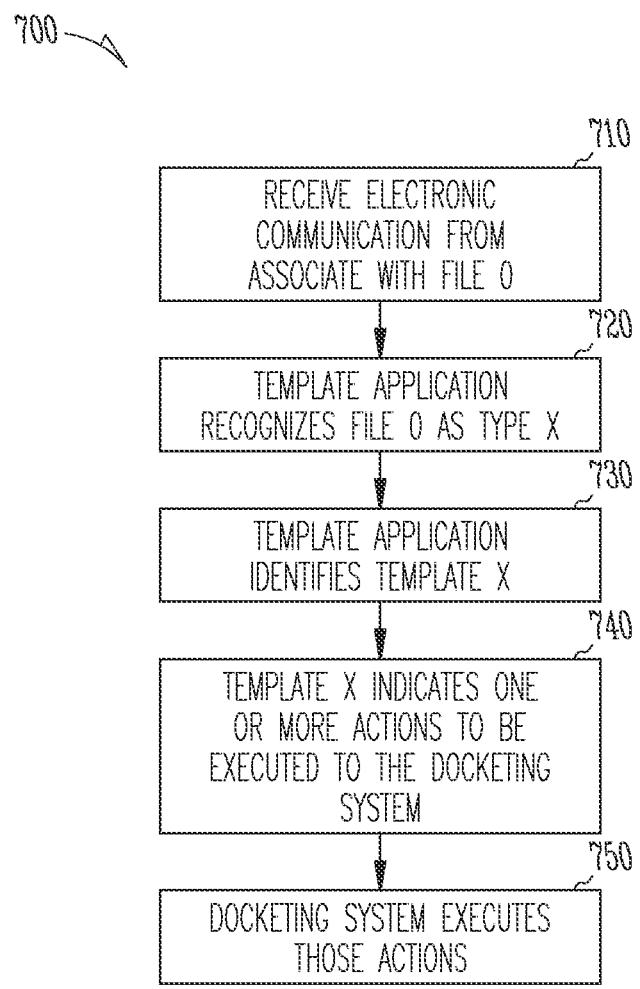
FIG. 7 depicts a schematic diagram of an example of using the template application.

FIG. 7 depicts a schematic diagram of an example method 700 of using template application. Method 700 can include blocks 710 to 760. In method 700, an electronic communication is received with an item to be docketed for a specific File 0.

The template application can receive the incoming electronic communication and identify the File 0 associated with the communication (step 710). For example, an incoming electronic communication from a governmental agency can be received, referencing a pending patent application. The template application can then analyze the File 0 and identify the File 0 is of type X, for example, a pending patent application (step 720). Subsequently, the template application can select an appropriate template X, correlated to the type X of File 0 (step 730). For example, once File 0 is identified as a pending patent application, the template application can select or suggest templates that are used for that particular type of pending patent application. Once selected, the template can be filled out, and the system can execute one or more actions based on data produced from that template (steps 740 and 750). For example, a deadline can be automatically docketed for the pending patent application based on the electronic communication from the governmental agency.

Figure 8:
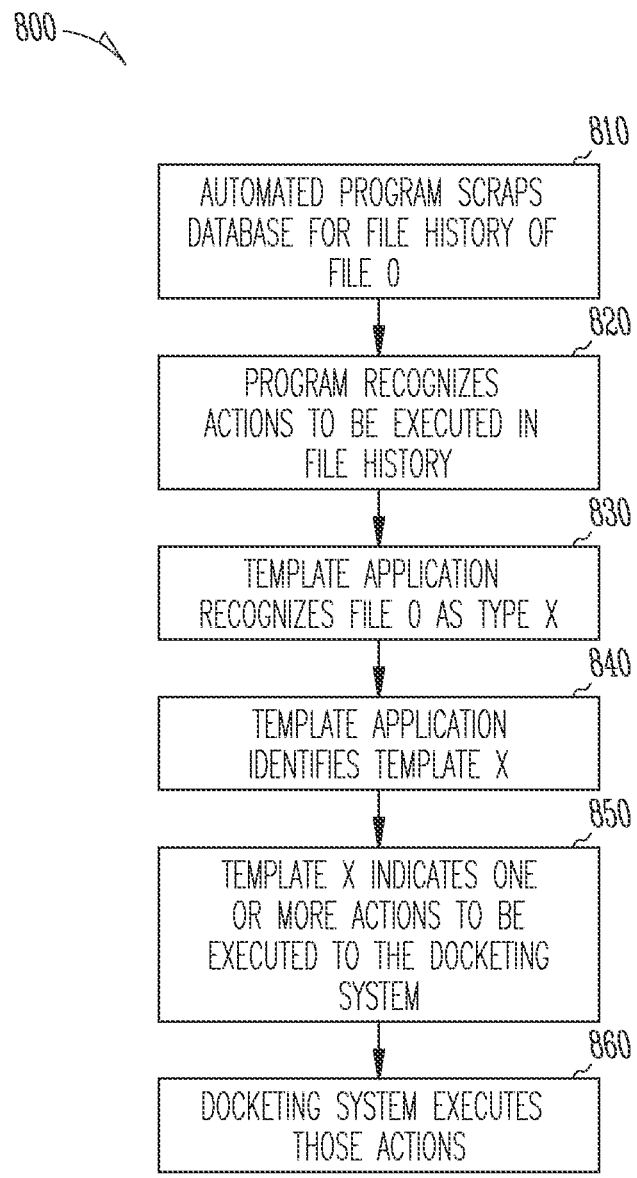
FIG. 8 depicts a schematic diagram of an example of using the template application.

FIG. 8 depicts a schematic diagram of an example method 800 of using the template application. Method 800 can include blocks 810 to 860.

In method 800, a scrapping program can be used in conjunction with the template application. In this case, the scrapping program can be configured to monitor, check, and retrieve data from one or more databases, such as official governmental databases. For example, the scrapping program can work with the U.S. Patent and Trademark Office public database to retrieve new information and events occurring in certain patent or trademark filings.

In step 810, the scrapping program can retrieve information related to at least one item to be docketed from a database. The scrapping program can be trained to identify an item requiring action, such as by comparing the current items scrapped to a file history and standard timeline for that type of case. (step 820).

For example, where a file history indicates that a response to final office action was recently filed, and a new item is scrapped from the file history, the system can determine that the likely type of item that was scrapped is an advisory action. Once the item to be docketed is recognized, the template application can additionally recognize the type of file. (step 830).

Subsequently, the template application can identify a template (840), fill out the template, and execute one or more actions based on the template (steps 850 and 860).

Computer Example

Figure 9:
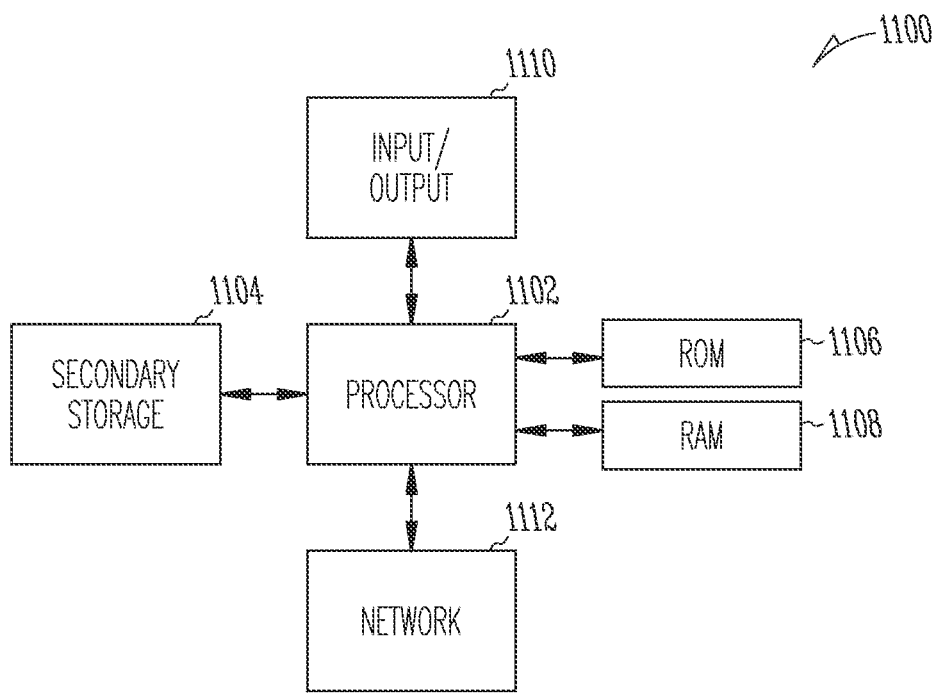
FIG. 9 is a block diagram of a typical, general-purpose computer that may be programmed into a special purpose computer suitable for implementing one or more examples of the manifest record generating program disclosed herein.

FIG. 9 is a block diagram of a typical, general-purpose computer 1100 that may be programmed into a special purpose computer suitable for implementing one or more examples of the manifest record generating program disclosed herein. The manifest record generating program described above may be implemented on any general-purpose processing component, such as a computer with sufficient processing power, memory resources, and communications throughput capability to handle the necessary workload placed upon it. The computer 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

The devices described herein may be configured to include computer-readable non-transitory media storing computer readable instructions and one or more processors coupled to the memory, and when executing the computer readable instructions configure the computer 1100 to perform method steps and operations described above with reference to FIG. 3 to FIG. 9. The computer-readable non-transitory media includes all types of computer readable media, including magnetic storage media, optical storage media, flash media and solid-state storage media.

It should be further understood that software including one or more computer-executable instructions that facilitate processing and operations as described above with reference to any one or all of steps of the disclosure may be installed in and sold with one or more servers and/or one or more routers and/or one or more devices within consumer and/or producer domains consistent with the disclosure. Alternatively, the software may be obtained and loaded into one or more servers and/or one or more routers and/or one or more devices within consumer and/or producer domains consistent with the disclosure, including obtaining the software through physical medium or distribution system, including, for example, from a server owned by the software creator or from a server not owned but used by the software creator. The software may be stored on a server for distribution over the Internet, for example.

Also, it will be understood by one skilled in the art that this disclosure is not limited in its application to the details of construction and the arrangement of components set forth in the description or illustrated in the drawings. The examples herein are capable of other examples, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrated examples may be implemented, at least in part, in digital electronic circuitry, analog electronic circuitry, or in computer hardware, firmware, software, or in combinations of them. These components may be implemented, for example, as a computing program product such as a computing program, program code or computer instructions tangibly embodied in an information carrier, or in a machine-readable storage device, for execution by, or to control the operation of, data processing apparatus such as a programmable processor, a computer, or multiple computers.

A computing program may be written in any form of programming language, including compiled or interpreted languages, and it may be deployed in any form, including as a stand-alone program or as a module, component, subroutine, or other unit suitable for use in a computing environment. A computing program may be deployed to be executed on one computer or on multiple computers at one site or distributed across multiple sites and interconnected by a communication network. Also, functional programs, codes, and code segments for accomplishing the techniques described herein may be easily construed as within the scope of the present disclosure by programmers skilled in the art. Method steps associated with the illustrative examples may be performed by one or more programmable processors executing a computing program, code or instructions to perform functions (e.g., by operating on input data and/or generating an output). Method steps may also be performed by, and apparatus may be implemented as, special purpose logic circuitry, e.g., an FPGA (field programmable gate array) or an ASIC (application-specific integrated circuit), for example.

The various illustrative logical blocks, modules, and circuits described in connection with the examples disclosed herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computing program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computing program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory may be supplemented by or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art further appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure. A software module may reside in random access memory (RAM), flash memory, ROM, EPROM, EEPROM, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. In other words, the processor and the storage medium may reside in an integrated circuit or be implemented as discrete components.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium, or combination of multiple media, that is capable of storing instructions for execution by one or more processors, such that the instructions, when executed by one or more processors cause the one or more processors to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

VARIOUS NOTES & EXAMPLES

Example 1 can include a method of executing an action for a file, the method comprising: receiving an item to be docketed from one of a plurality of sources for the file, wherein the item to be docketed comprises at least one task to be completed, and wherein the item to be docketed is a one of a plurality of types of item to be docketed; selecting a template for the item to be docketed based on the source of the item to be docketed, wherein each of the plurality of sources is associated with one or more templates; implementing the template for the item to be docketed, wherein the template comprises one or more requirements for information to be supplied to report the item to be docketed; producing the information from the template and communicating the information to a receiving system; and executing the at least one task in the receiving system based on the information supplied by the template.

Example 2 can include Example 1, wherein the plurality of sources comprise computer systems associated with respective associated.

Example 3 can include Example 1, wherein the plurality of types of items to be docketed are particular types of documents to be reported.

Example 4 can include Example 1, wherein the at least one task comprises a deadline to be communicated or a deadline to be docketed.

Example 5 can include Example 1, wherein the at least one task comprises one or more actions to be executed.

Example 6 can include Example 1, wherein implementing the template comprises correlating a file type to the template.

Example 7 can include Example 1, wherein applying the template comprises correlating the at least one task to be completed to the template.

Example 8 can include Example 1, wherein receiving the items to be docketed comprises scrapping the item from a file history in a database.

Example 9 can include Example 1, wherein receiving the item to be docketed comprises receiving an electronic communication describing the item.

Example 10 can include a method comprising: receiving a plurality of items to be docketed, wherein each of the plurality of items includes one or more types of respective items to be docketed; locating a plurality of templates, each of the plurality of templates associated with one of the plurality of items to be docketed; and executing one or more actions for each of the plurality of items to be docketed based on the correlated plurality of templates.

Example 11 can include Example 10, wherein each of the plurality of templates is correlated with one or more outside organizations.

Example 12 can include Example 10, wherein each of the templates for each of the outside organizations comprises different rules and actions to be executed.

Example 13 can include a system for docketing incoming tasks, the system comprising: a template library comprising a plurality of templates correlated to the incoming tasks, each of the plurality of templates indicating one or more actions to be taken based on the correlated incoming task; a template application program for receiving information regarding one the incoming tasks, the template application program configured to choose one or more templates based on the incoming tasks and produce instructions for executing the one or more actions; and an automated docketing system for receiving instructions regarding one or more action, and executing the one or more action.

Example 14 can include Example 13, further comprising a database in communication with the template application program, the template application program configured to withdraw information regarding the incoming tasks from the database.

Example 15 can include Example 13, further comprising an electronic communication system connected to the template application program, the electronic communication system for providing information regarding the incoming tasks.

Example 16 can include Example 13, further comprising a file record repository connected to the automated docketing system.

Example 17 can include a non-transitory computer-readable medium that stores instructions that when executed by one or more processors cause the one or more processors to perform operations comprising: receiving an item to be docketed from one of a plurality of sources for the file, wherein the item to be docketed comprises at least one task to be completed, and wherein the item to be docketed is a one of a plurality of types of item to be docketed; selecting a template for the item to be docketed based on the source of the item to be docketed, wherein each of the plurality of sources is associated with one or more templates; implementing the template for the item to be docketed, wherein the template comprises one or more requirements for information to be supplied to report the item to be docketed, and producing the information from the template; communicating the information to a receiving system; and executing the at least one task in the receiving system based on the information supplied by the template.

Example 18 can include Example 17, wherein the plurality of sources comprise computer systems associated with respective associated.

Example 19 can include Example 10, wherein the plurality of types of items to be docketed are particular types of documents to be reported.

Example 20 can include Example 17, wherein receiving the item to be docketed comprises scrapping the item from a file history in a database.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part, Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method of executing an action for a file based on information from a template located in a computer-implemented docketing system, the method comprising:
    training a template application executing on one or more processors with incoming communications from a plurality of sources for the file to generate a machine learning model for selecting and implementing an applicable template for an item to be docketed, wherein training the template application comprises using text recognition to analyze unstructured text from the incoming communications, wherein using text recognition to analyze unstructured text comprises identifying, from the unstructured text, at least one compliance rule or deadline requirement specific to a source from the plurality of sources;
    receiving the item to be docketed from one of the plurality of sources for the file, wherein the item to be docketed is one of a plurality of types of items to be docketed;
    determining at least one task to be completed based on the item to be docketed;
    using the machine learning model to select an appropriate template for the item to be docketed from a template library, the template library comprising a plurality of templates, each template customized based on at least one task and the unstructured text from the incoming communications;
    implementing the template for the item to be docketed, wherein implementing the template comprises:
    filling out at least one field in the template;
    correlating a file type with the template;
    determining one or more requirements for information to be supplied to communicate the item to be docketed, the one or more requirements being determined by the machine learning model and;
    producing the information from the implemented template;
    communicating the information to a receiving system, and;
    executing the at least one task in the receiving system based on the information supplied by the implemented template, wherein executing the at least one task comprises automatically updating a docketing calendar and generating an electronic notification to a user based on the identified at least one compliance rule or deadline requirement.

2. The method of claim 1, wherein the plurality of sources comprise computer systems associated with respective sources for the file.

3. The method of claim 1, wherein the plurality of types of items to be docketed are particular types of documents to be reported.

4. The method of claim 1, wherein the at least one task comprises at least one of updating a docketing calendar, storing documents in a database, creating a reminder, implementing a workflow, generating electronic communications, and categorizing documents in a document management system.

5. The method of claim 4, wherein implementing a workflow comprises generating additional tasks and assigning tasks to a user.

6. The method of claim 1, wherein receiving the item to be docketed comprises scraping the item from a file history in a database.

7. The method of claim 1, wherein receiving the item to be docketed comprises receiving an electronic communication describing the item.

8. A method of executing an action for a file based on information from a template located in a computer-implemented docketing system, the method comprising:
   training a template application executing on one or more processors with incoming communications from a plurality of sources for the file to generate a machine learning model for selecting and implementing an applicable plurality of templates for a plurality of items to be docketed, wherein training the template application comprises using text recognition to analyze unstructured text from the incoming communications, wherein using text recognition to analyze unstructured text comprises identifying, from the unstructured text, at least one compliance rule and at least one deadline requirement, where both the at least one compliance rule and the at least one deadline requirement are specific to a source from the plurality of sources;
   receiving the plurality of items to be docketed from the plurality of sources for the file, wherein each of the plurality of items includes one or more types of respective items to be docketed;
   using the machine learning model to select an applicable plurality of templates from a template library, wherein each of the plurality of templates is customized based on one or more requirements for information to be supplied to report an item to be docketed, the one or more requirements being determined by the machine learning model and a file type correlated to the template; and
   executing one or more actions for each of the plurality of items to be docketed based on the correlated plurality of templates, wherein executing the one or more actions comprises automatically updating a docketing calendar and generating an electronic notification to a user based on the identified at least one compliance rule or deadline requirement.

9. The method of claim 8, wherein each template of the plurality of templates is correlated with one or more outside organizations.

10. The method of claim 9, wherein each of the templates for each of the one or more outside organizations comprises different rules and actions to be executed.

11. A system for executing one or more actions for a file based on information from an implemented template located in a computer-implemented docketing system, the system comprising:
   one or more processors;
   a memory storing computer-executable instructions;
   a template application program executing on the one or more processors trained with incoming communications from a plurality of sources for the file to generate a machine learning model for selecting and implementing an applicable template for an item to be docketed, wherein training the template application program comprises using text recognition to analyze unstructured text from the incoming communications, wherein using text recognition to analyze unstructured text comprises identifying, from the unstructured text, at least one compliance rule and at least one deadline requirement, where both the at least one compliance rule and the at least one deadline requirement are specific to a source from the plurality of sources;
   a template library comprising a plurality of templates, each of the plurality of templates:
   customized based on the unstructured text from the incoming communications;
   correlating to one or more incoming tasks and one or more sources from the plurality of sources for the file;
   indicating one or more actions to be taken based on the unstructured text from the incoming communications; and
   comprising one or more requirements for information to be supplied to report an item to be docketed, the one or more requirements being determined by the machine learning model;
   the template application program selecting one or more templates and producing instructions for executing the one or more actions; and
   an automated docketing system for receiving the instructions for executing the one or more actions, and executing the one or more actions, wherein executing the one or more actions comprises automatically updating a docketing calendar and generating an electronic notification to a user based on the identified at least one compliance rule or deadline requirement.

12. The system of claim 11, further comprising a database in communication with the template application program, the template application program configured to withdraw information regarding the one or more incoming tasks from the database.

13. The system of claim 11, further comprising an electronic communication system connected to the template application program, the electronic communication system for providing information regarding the one or more incoming tasks.

14. The system of claim 11, further comprising a file record repository connected to the automated docketing system.

15. A non-transitory computer-readable medium that stores instructions that when executed by one or more processors cause the one or more processors to perform operations comprising a method of executing an action for a file based on information from an implemented template located in a computer-implemented docketing system, the method comprising:
   training a template application executing on one or more processors with incoming communications from a plurality of sources for the file to generate a machine learning model for selecting and implementing an applicable template for an item to be docketed, wherein training the template application comprises using text recognition to analyze unstructured text from the incoming communications, wherein using text recognition to analyze unstructured text comprises identifying, from the unstructured text, at least one compliance rule and at least one deadline requirement, where both the at least one compliance rule and the at least one deadline requirement are specific to a source from the plurality of sources;
   receiving the item to be docketed from one of the plurality of sources for the file, wherein the item to be docketed is one of a plurality of types of items to be docketed;

determining at least one task to be completed based on the item to be docketed;

using the machine learning model to select an appropriate template for the item to be docketed from a template library, the template library comprising a plurality of templates, each template being customized based on at least one task and the unstructured text from the incoming communications;

implementing a template for the item to be docketed, wherein implementing the template comprises:

filling out at least one field in the template;

correlating a file type with the template;

determining one or more requirements for information to be supplied to communicate the item to be docketed, the one or more requirements being determined by the machine learning model and;

producing the information from the implemented template;

communicating the information to a receiving system, and;

executing the at least one task in the receiving system based on the information supplied by the implemented template, wherein executing the at least one task comprises automatically updating a docketing calendar and generating an electronic notification to a user based on the identified at least one compliance rule or deadline requirement.

16. The non-transitory computer-readable medium of claim 15, wherein the plurality of sources comprise computer systems associated with respective sources for the file.

17. The non-transitory computer-readable medium of claim 15, wherein the plurality of types of items to be docketed are particular types of documents to be reported.

18. The non-transitory computer-readable medium of claim 15, wherein receiving the item to be docketed comprises scraping the item from a file history in a database.

* * * * *